US010699252B2

(12) United States Patent
Zhu

(10) Patent No.: US 10,699,252 B2
(45) Date of Patent: Jun. 30, 2020

(54) SCHEDULE MANAGEMENT METHOD AND SCHEDULE MANAGEMENT DEVICE

(71) Applicant: FUJITSU LIMITED, Kawasaki-shi, Kanagawa (JP)

(72) Inventor: Wei Zhu, Edogawa (JP)

(73) Assignee: FUJITSU LIMITED, Kawasaki (JP)

( * ) Notice: Subject to any disclaimer, the term of this patent is extended or adjusted under 35 U.S.C. 154(b) by 275 days.

(21) Appl. No.: 15/652,790

(22) Filed: Jul. 18, 2017

(65) Prior Publication Data

US 2018/0068276 A1    Mar. 8, 2018

(30) Foreign Application Priority Data

Sep. 7, 2016   (JP) .................................. 2016-175067

(51) Int. Cl.
*G06Q 10/10*   (2012.01)
*G06F 16/9038*   (2019.01)

(52) U.S. Cl.
CPC ..... *G06Q 10/1097* (2013.01); *G06F 16/9038* (2019.01)

(58) Field of Classification Search
CPC .......................................... G06Q 10/00–50/00
USPC ................................. 705/7.11–7.42
See application file for complete search history.

(56) References Cited

U.S. PATENT DOCUMENTS 5,995,966 A * 11/1999 Kii .......................... G06F 16/30
6,249,806 B1 * 6/2001 Kohda ................... H04H 20/38
348/E7.071
6,336,072 B1 * 1/2002 Takayama ............... G01C 21/34
340/995.1
6,965,868 B1 * 11/2005 Bednarek ........... G06Q 30/0201
705/26.1
7,444,377 B2 * 10/2008 Fujimoto ................ G07C 11/00
345/619
8,122,084 B2 * 2/2012 Beringer ................ G06Q 10/10
709/204

(Continued)

FOREIGN PATENT DOCUMENTS

JP        2003-115951        4/2003

OTHER PUBLICATIONS

Gremler, Dwayne D., and Kevin P. Gwinner. "Rapport-building behaviors used by retail employees." Journal of Retailing 84.3 (2008): 308-324. (Year: 2008).*

(Continued)

Primary Examiner — Alan S Miller
(74) Attorney, Agent, or Firm — Fujitsu Patent Center

(57) ABSTRACT

A schedule management program to manage a schedule for an insurance salesperson. A storage unit stores contents information, customer information, a schedule of the insurance salesperson and a task related to a contact. A common attribute is specified in accordance with an evaluation result related to the degree of common between attribute information related to the insurance salesperson and a first customer when a task related to a contact with respect to a first customer is included in a schedule of the insurance salesperson. A content in which many search keys are included in the item of the specified common attribute and the evaluation is high is retrieved. The retrieved content being associated with the task for providing an appropriate conversation topic to the customer is displayed based on the specified attribute.

12 Claims, 12 Drawing Sheets

(56) References Cited

U.S. PATENT DOCUMENTS

| | | | | |
|---|---|---|---|---|
| 8,346,864 B1* | 1/2013 | Amidon | H04L 65/1069 | 709/204 |
| 8,775,517 B1* | 7/2014 | Goldman | G06F 16/9535 | 709/204 |
| 8,868,448 B2* | 10/2014 | Freishtat | G06Q 30/0617 | 705/26.41 |
| 8,881,028 B2* | 11/2014 | Klinger | G06Q 10/00 | 715/703 |
| 9,571,635 B2* | 2/2017 | Fan | H04M 3/42042 | |
| 2001/0032140 A1* | 10/2001 | Hoffman | G06Q 30/02 | 705/26.43 |
| 2002/0083167 A1* | 6/2002 | Costigan | G06Q 30/02 | 709/224 |
| 2002/0091591 A1* | 7/2002 | Tsumura | G06Q 10/087 | 705/28 |
| 2002/0099499 A1* | 7/2002 | Takayama | G01C 21/34 | 701/400 |
| 2002/0143609 A1* | 10/2002 | Magouirk | G06Q 10/06311 | 705/7.16 |
| 2003/0040927 A1* | 2/2003 | Sato | G06Q 20/20 | 705/1.1 |
| 2003/0212566 A1* | 11/2003 | Fergusson | G06Q 30/018 | 705/317 |
| 2004/0064361 A1* | 4/2004 | Anderson | G06Q 30/02 | 705/14.53 |
| 2004/0083265 A1* | 4/2004 | Beringer | G06Q 10/10 | 709/204 |
| 2004/0153368 A1* | 8/2004 | Freishtat | G06Q 30/0623 | 705/26.41 |
| 2004/0205125 A1* | 10/2004 | Fujimoto | G07C 11/00 | 709/204 |
| 2005/0021750 A1* | 1/2005 | Abrams | G06Q 10/10 | 709/225 |
| 2005/0193054 A1* | 9/2005 | Wilson | G06Q 30/02 | 709/200 |
| 2005/0273702 A1* | 12/2005 | Trabucco | G06F 16/958 | 715/234 |
| 2008/0120128 A1* | 5/2008 | Berglund | G06Q 30/0603 | 705/1.1 |
| 2009/0113316 A1* | 4/2009 | Palermo | G06Q 30/02 | 715/758 |
| 2009/0222358 A1* | 9/2009 | Bednarek | G06Q 30/0201 | 705/26.1 |
| 2009/0248460 A1* | 10/2009 | Johnson | G06Q 10/06 | 705/7.29 |
| 2009/0292649 A1* | 11/2009 | Somech | G06Q 40/02 | 705/36 R |
| 2010/0223100 A1* | 9/2010 | Lee | G06O 10/063 | 705/7.11 |
| 2011/0022602 A1* | 1/2011 | Luo | G06Q 10/10 | 707/748 |
| 2011/0035250 A1* | 2/2011 | Finucan | G06Q 10/109 | 455/418 |
| 2011/0070872 A1* | 3/2011 | Ellanti | H04M 1/72572 | 455/414.2 |
| 2011/0179025 A1* | 7/2011 | Chuang | G06F 16/9535 | 707/728 |
| 2012/0158549 A1* | 6/2012 | Dapoz | G06Q 30/0641 | 705/27.1 |
| 2012/0266081 A1* | 10/2012 | Kao | G06Q 50/01 | 715/751 |
| 2012/0290979 A1* | 11/2012 | Devecka | H04W 4/21 | 715/810 |
| 2013/0018982 A1* | 1/2013 | McConnell | G06F 16/337 | 709/217 |
| 2013/0124365 A1* | 5/2013 | Pradeep | G06Q 30/06 | 705/26.43 |
| 2013/0145285 A1* | 6/2013 | Klinger | G06Q 10/00 | 715/753 |
| 2013/0297368 A1* | 11/2013 | Meyer | G06Q 10/06 | 705/7.26 |
| 2014/0046711 A1* | 2/2014 | Borodow | G06Q 10/063114 | 705/7.15 |
| 2014/0173664 A1* | 6/2014 | Kusano | H04N 21/4622 | 725/51 |
| 2015/0026173 A1* | 1/2015 | Mishra | G06Q 30/02 | 707/733 |
| 2015/0088763 A1* | 3/2015 | Titus | G06Q 10/103 | 705/301 |
| 2015/0099496 A1* | 4/2015 | Fan | H04M 3/42042 | 455/415 |
| 2015/0149237 A1* | 5/2015 | Brock | G06F 16/245 | 705/7.27 |
| 2015/0254311 A1* | 9/2015 | Lerner | G06F 16/248 | 707/722 |
| 2015/0347586 A1* | 12/2015 | Fasen | G06F 16/93 | 707/722 |
| 2016/0063127 A1* | 3/2016 | Naveh | G06Q 50/01 | 707/722 |
| 2016/0247105 A1* | 8/2016 | Vaze | H04W 4/029 | |

OTHER PUBLICATIONS

Pettijohn, Charles E., Elizabeth J. Rozell, and Andrew Newman. "The relationship between emotional intelligence and customer orientation for pharmaceutical salespeople." International Journal of Pharmaceutical and Healthcare Marketing (2010). (Year: 2010).*

* cited by examiner

FIG.3

| USER ID | USER NAME | WORK LOCATION ADDRESS |
|---|---|---|
| 001 | USER A | XX PREFECTURE, XX CITY, XX |
| 002 | USER B | XX PREFECTURE, XX CITY, XX |
| ⋮ | | |

FIG.4

| CUSTOM-ER ID | CUSTOM-ER NAME | HANDLING USER ID | PHONE NUMBER | ADDRESS | PUR-CHASED INSURANCE |
|---|---|---|---|---|---|
| 0001 | CUSTOM-ER A | 001 | XXX-XXXX-XXXX | XX PREFECTURE, XX CITY, XX | XXX |
| 0002 | CUSTOM-ER B | 001 | XXX-XXXX-XXXX | XX PREFECTURE, XX CITY, XX | XXX |
| 0003 | CUSTOM-ER C | 001 | XXX-XXXX-XXXX | XX PREFECTURE, XX CITY, XX | XXX |
| ⋮ | | | | | |

FIG.5

| USER ID | TASK ID | TASK | START DATE AND TIME | END DATE AND TIME | CUSTOMER ID |
|---|---|---|---|---|---|
| 001 | 00001 | MORNING MEETING | 2016/6/30 9:00 | 2016/6/30 9:30 | - |
| 001 | 00002 | PHONE | 2016/6/30 10:00 | 2016/6/30 11:00 | 0003 |
| 001 | 00003 | VISIT PREPARATION | 2016/6/30 11:00 | 2016/6/30 12:00 | - |
| 001 | 00004 | LUNCH | 2016/6/30 12:00 | 2016/6/30 12:30 | - |
| 001 | 00005 | MOVE | 2016/6/30 12:40 | 2016/6/30 13:30 | - |
| 001 | 00006 | VISIT | 2016/6/30 13:30 | 2016/6/30 15:00 | 0001 |
| 001 | 00007 | MOVE | 2016/6/30 15:10 | 2016/6/30 16:00 | - |
| 001 | 00008 | VISIT | 2016/6/30 16:00 | 2016/6/30 17:00 | 0002 |
| 001 | 00009 | MOVE | 2016/6/30 17:00 | 2016/6/30 17:40 | - |
| 001 | 00010 | DAILY REPORT | 2016/6/30 17:40 | 2016/6/30 18:10 | - |
| | | ... | | | |

FIG.6

| ARTICLE ID | ARTICLE | CLASSIFI-CATION | ATTRIBUTE | EVALUATION | COLLECTION DATE AND TIME |
|---|---|---|---|---|---|
| ⋮ | | | | | |
| 123456 | XXXX⋯ | BUSINESS | PHOTO-GRAPH, ⋯ | 793 | 2016/6/29 18:00 |
| 123457 | XXXX⋯ | SPORT | GOLF, ⋯ | 194 | 2016/6/29 18:00 |
| 123458 | XXXX⋯ | SPORT | VEHICLE, ⋯ | 250 | 2016/6/29 18:00 |
| ⋮ | | | | | |

| USER ID | TASK ID | CONTENT ID | CUSTOMER ID | REACTION LEVEL |
|---|---|---|---|---|
| 001 | 00006 | 123456 | 0001 | 5 |
| 001 | 00006 | 123457 | - | 3 |
| ⋮ | | | | |

| USER ID | ATTRIBUTE |
|---------|-----------|
| 001 | PHOTOGRAPH, VEHICLE, ⋯ |
| ⋮ | |

| CUSTOMER ID | ATTRIBUTE |
|-------------|-----------|
| 0001 | PHOTOGRAPH, GOLF, ⋯ |
| 0002 | VEHICLE, MOVIE, ⋯ |
| ⋮ | |

36

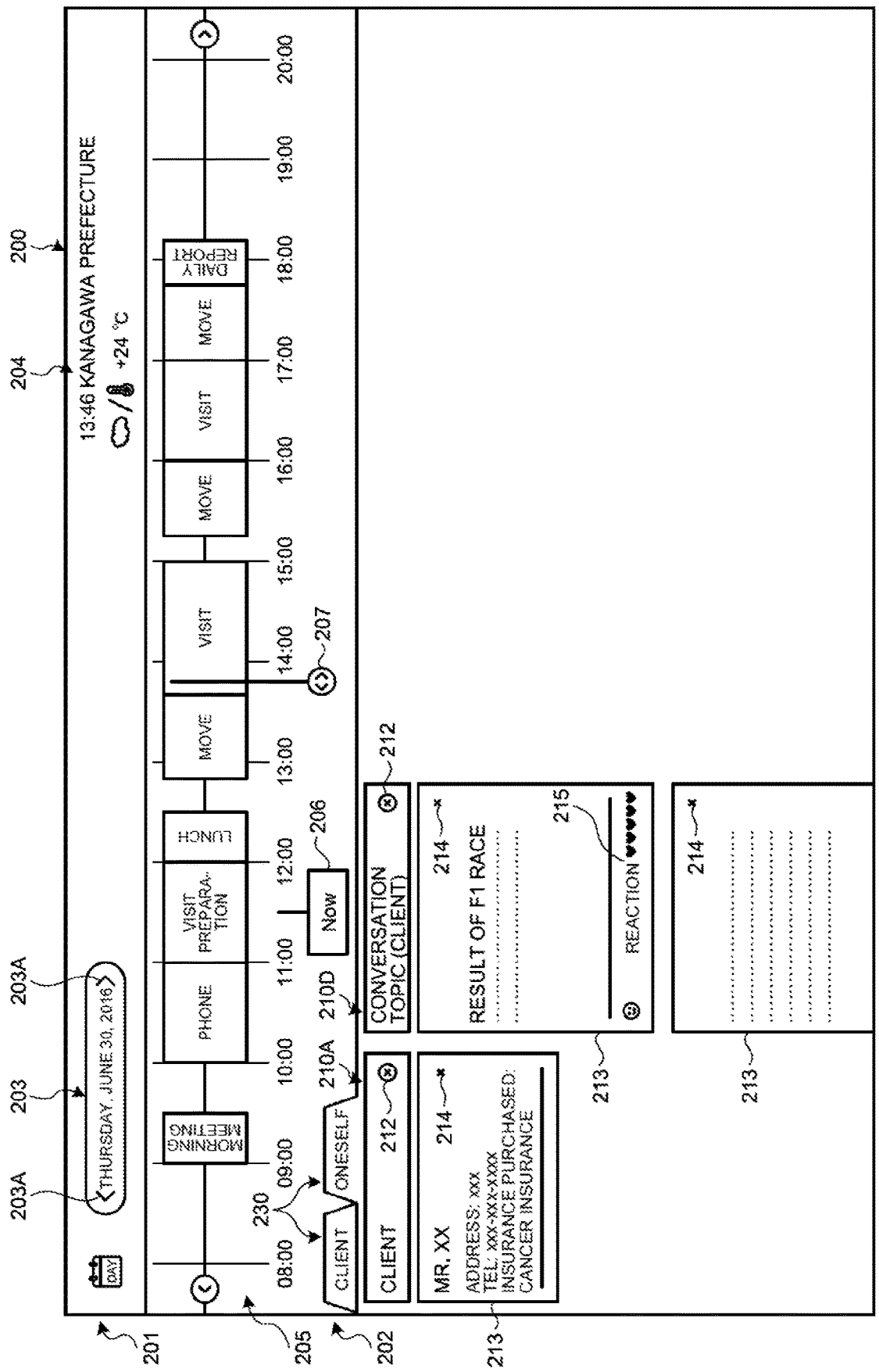

SCHEDULE MANAGEMENT METHOD AND SCHEDULE MANAGEMENT DEVICE

CROSS-REFERENCE TO RELATED APPLICATION

This application is based upon and claims the benefit of priority of the prior Japanese Patent Application No. 2016-175067, filed on Sep. 7, 2016, the entire contents of which are incorporated herein by reference.

FIELD

The embodiments discussed herein are related to a schedule management method and a schedule management device.

BACKGROUND

Conventionally, schedule management software that manages schedules is used. With this schedule management software, for example, various kinds of tasks, such as a task of making a phone call to a customer, a task of visiting a customer, or the like, to be performed with respect to the contact destination are registered together with the planned date and time.
Patent Document 1: Japanese Laid-open Patent Publication No. 2003-115951

The conventional schedule management software can grasp the type of tasks with respect to the registered contact destination and the planned date and time. For example, by registering a phone call to a customer or a customer visit as a task in the schedule management software, sales staff, such as an insurance salesperson, or the like, can manage the schedule of making the phone call to the customer or visiting to the customer.

However, the conventional schedule management software is not able to support construction of the trust relationship with the contact destination. For example, before talking about business with a customer, the sales staff constructs the trust relationship with the customer by making a small talk or a chat. The conversation topic of conversation that can be provided as a small talk or a chat is dependent on individual skills and thus not all sales staff abundantly has conversation topics.

Furthermore, the customers' interest of topic differs. Consequently, the sales staff sometimes is not able to provide an appropriate conversation topic to a customer and sometimes takes great pains to construct the trust relationship with the customer.

SUMMARY

According to an aspect of an embodiment, a non-transitory computer-readable recording medium stores therein a program that causes a computer to execute a process. The process includes specifying, when a task related to a contact with respect to a first contact destination is included in a schedule of a first user stored in a storage unit, an attribute that has a commonality in accordance with an evaluation result related to the degree of common between attribute information registered related to the first user and attribute information registered related to the first contact destination; and controlling, based on the specified attribute, information that is displayed by being associated with the task.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a schematic diagram illustrating an example of the data structure of user information;

FIG. 4 is a schematic diagram illustrating an example of the data structure of customer information;

FIG. 5 is a schematic diagram illustrating an example of the data structure of schedule information;

FIG. 6 is a schematic diagram illustrating an example of the data structure of content information;

FIG. 7 is a schematic diagram illustrating an example of the data structure of reaction information;

FIG. 8 is a schematic diagram illustrating an example of the data structure of user attribute information;

FIG. 9 is a schematic diagram illustrating an example of the data structure of customer attribute information;

FIG. 13B is a schematic diagram illustrating an example of the content screen.

DESCRIPTION OF EMBODIMENTS

Preferred embodiments of the present invention will be explained with reference to accompanying drawings. The present invention is not limited to the embodiments described below. Furthermore, each of the embodiments can be used in any appropriate combination as long as the embodiments do not conflict with each other.

[a] First Embodiment

System Configuration

Figure 1:
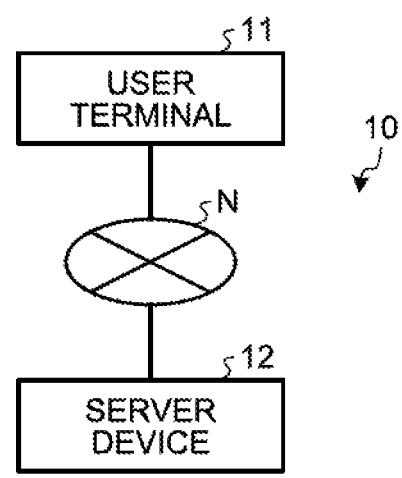
FIG. 1 is a schematic diagram illustrating, in outline, the configuration of a schedule system according to a first embodiment.

First, an example of a schedule system 10 according to a first embodiment will be described. FIG. 1 is a schematic diagram illustrating, in outline, the configuration of the schedule system according to a first embodiment. As illustrated in FIG. 1, the schedule system 10 includes a user terminal 11 and a server device 12. In the embodiment, the server device 12 corresponds to a schedule management device.

The schedule system 10 is a system that manages a schedule of a user. In the embodiment, a description will be given of a case of, as an example, managing a schedule of an insurance salesperson as a user. The insurance salesperson visits a customer, engages in business of insurance and, sells the insurance. Furthermore, in an office of an insurance company, the insurance salesperson conducts various kinds of preparation works in order to engage in business of insurance and sell the insurance. The user terminal 11 is connected to the server device 12 via a network N in a manner the devices can communicate with each other. Any kind of communication network, such as a local area network (LAN), a virtual private network (VPN), a mobile telecommunications network, or the like, may be used as the network N irrespective of whether the network is a wired or wireless connection.

The user terminal 11 is a device that is owned by an insurance salesperson who is a user. For example, the user terminal 11 is a mobile terminal device, such as a smartphone, a tablet terminal, or the like. The insurance salesperson accesses the server device 12 by using the user terminal 11, registers a plan of action or the achievements, and manages the schedule.

The server device 12 is a computer that provides a user with a schedule service that manages the schedule. The schedule service may also be provided by a single computer or may also be provided by a computer system constituted by a plurality of computers. Furthermore, in the embodiment, a description will be given of a case, as an example, in which the schedule service is provided by the single server device 12.

Server Device

Figure 2:
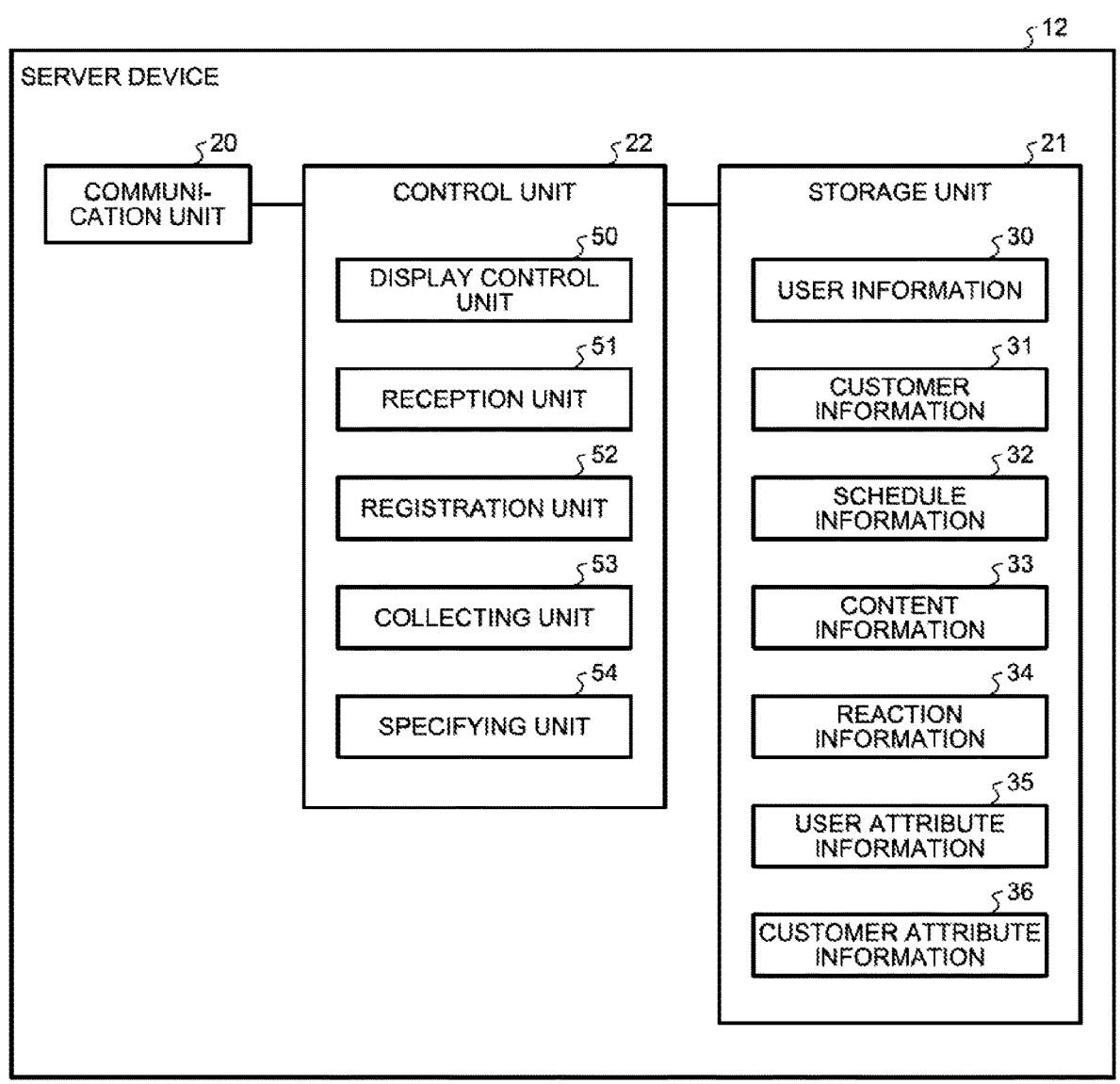
FIG. 2 is a block diagram illustrating an example of the configuration of a server device.

In the following, the configuration of the server device 12 according to the first embodiment will be described. FIG. 2 is a block diagram illustrating an example of the configuration of the server device. As illustrated in FIG. 2, the server device 12 includes a communication unit 20, a storage unit 21, and a control unit 22.

The communication unit 20 is an interface for performing communication control with other devices. The communication unit 20 sends and receives various kinds of information to and from the other devices via the network N. A network interface card, such as a LAN card, or the like can be used as the communication unit 20.

The storage unit 21 is a storage device, such as a hard disk, a solid state drive (SSD), an optical disk, or the like. Furthermore, the storage unit 21 may also be a semiconductor memory, such as a random access memory (RAM), a flash memory, a non-volatile static random access memory (NVSRAM), or the like, that can rewrite data. Furthermore, the storage unit 21 may also be an external server that stores therein data and that provides the data.

The storage unit 21 stores therein various kinds of programs. Furthermore, the storage unit 21 stores therein various kinds of data used by the various kinds of programs. For example, the storage unit 21 stores therein user information 30, customer information 31, schedule information 32, content information 33, reaction information 34, user attribute information 35, and customer attribute information 36.

The user information 30 is the data that stores therein information related to a user who performs schedule management. In the embodiment, the user information 30 stores therein the information related to an insurance salesperson as a user who performs the schedule management.

FIG. 3 is a schematic diagram illustrating an example of the data structure of the user information. As illustrated in FIG. 3, the user information 30 includes items, such as the "user ID", the "user name", the "work location address", and the like. Furthermore, each of the items included in the user information 30 illustrated in FIG. 3 is an example and another item may also be included.

The item of the user ID is an area that stores therein identification information that identifies the insurance salesperson. A unique user identification (ID) is attached as the identification information to the insurance salesperson. In the item of the user ID, the user ID attached to the insurance salesperson is stored. The item of the user name is an area that stores therein the name of the user. The item of the work location address is an area that stores therein the address of the place of work for the insurance salesperson doing the work. For example, the example illustrated in FIG. 3 indicates that the insurance salesperson with the user name of "user A" has the user ID of "001" and indicates that the work location address is "XX prefecture, XX city, XX".

The customer information 31 is the data that stores therein information related to customers. In the embodiment, the customer information 31 stores therein the information related to the customer to whom the insurance salesperson sold insurance policies and related to the customer to whom the insurance salesperson is doing business.

FIG. 4 is a schematic diagram illustrating an example of the data structure of the customer information. As illustrated in FIG. 4, the customer information 31 includes items, such as the "customer ID", the "customer name", the "handling user ID", the "phone number", the "address", "purchased insurance", and the like. Furthermore, each of the items included in the customer information 31 illustrated in FIG. 4 is an example and another item may also be included.

The item of the customer ID is an area that stores therein identification information that identifies a customer. A unique customer ID is attached as the identification information to the customer. In the item of the customer ID, the customer ID attached to the customer is stored. The item of the customer name is an area that stores therein the name of the customer. The item of the handling user ID is an area that stores therein the user ID of the insurance salesperson who handles the customer. The item of the phone number is an area that stores therein the phone number of the customer. The item of the address is an area that stores therein the address of the customer. The item of the purchased insurance is an area that stores therein an insurance purchased by the customer. For example, the example illustrated in FIG. 4 indicates that the customer with the customer name of "customer A" has the customer ID of "0001" and indicates that the user ID of the handling insurance salesperson is "001". Furthermore, the example illustrated in FIG. 4 indicates that, regarding the customer with the customer name of "customer A", the phone number is "XXX-XXXX-XXXX", the address is "XX prefecture, XX city, XX", and the customer has purchased "XXX" insurance.

The schedule information 32 is the data that stores therein information related to the tasks registered in a schedule. In the schedule information 32, the information related to the tasks registered in the schedule of a user is stored for each user.

FIG. 5 is a schematic diagram illustrating an example of the data structure of the schedule information. As illustrated in FIG. 5, the schedule information 32 includes items, such as the "user ID", the "task ID", the "task", the "start date and time", the "end date and time", the "customer ID", and the like. Furthermore, each of the items included in the schedule information 32 illustrated in FIG. 5 is an example and another item may also be included.

The item of the user ID is an area that stores therein the user ID of the insurance salesperson who has registered the task. The item of the task ID is an area that stores therein the identification information that identifies the task registered in the schedule. If the insurance salesperson registers a task in the schedule, a unique task ID is attached to the registered task as the identification information that identifies the registered task. In the item of the task ID, the task ID of the task registered in the schedule is stored. The item of the task is an area that stores therein the type of tasks registered in the schedule. The item of the start date and time is an area that stores therein the start date and time of the task registered in the schedule. The item of the end date and time is an area that stores therein the end date and time of the task registered in the schedule. The item of the customer ID is an area that stores therein the customer ID of the customer targeted for the task registered in the schedule. In the item of the customer ID, if the task registered in the schedule is the work that is to be performed on the specific customer, the customer ID of the specific customer is stored, whereas, if the task registered in the schedule is the work that is not to be performed on the specific customer, "-" is stored. For example, in the example illustrated in FIG. 5 indicates that, regarding the insurance salesperson with the user ID of "001", the task of the "morning meeting" with the task ID of "00001" is registered in the schedule between 9:00 and 9:30 on Jun. 30, 2016. Furthermore, because the item of the customer ID is "-", it is indicated that the task of the "morning meeting" is not the work performed on the specific customer.

The content information 33 is data that stores therein information related to the content, such as collected articles, or the like. In the embodiment, the content is periodically collected from a provider of the content, such as a newspaper publishing company, or the like, and information related to the collected content is stored in the content information 33.

FIG. 6 is a schematic diagram illustrating an example of the data structure of the content information. As illustrated in FIG. 6, the content information 33 includes items, such as the "article ID", the "article", the "classification", the "attribute", the "evaluation", the "collection date and time", and the like. Furthermore, each of the items included in the content information 33 illustrated in FIG. 6 is an example and another item may also be included.

The item of the article ID is an area that stores therein the identification information that identifies the content. A unique article ID is attached to the content as the identification information. The article ID may also be attached by the server device 12 so as to be unique to the collected content. Furthermore, if the provider of the content attaches the identification information to the content, the article ID may also be created by diverting the identification information attached by the provider of the content. For example, if the provider of the content attaches the identification information to the content, the article ID may also be a combination of the identification information that identifies the provider of the content and the identification information on the content. The item of the article is an area that stores therein the substance of the content, such as the collected articles, and the like, or the area that stores therein the storage destination of the content. In the embodiment, the substance of the content, such as a sentence of the content, or the like, may also be stored in the item of the content without changing anything or the content is stored in the storage unit 21 and the information on the storage destination, such as the path indicating the storage destination, or the like, may also be stored in the item of the content. The item of the classification is an area that stores therein, in accordance with the substance of the content, the category obtained when the content classified into categories. The item of the attribute is an area that stores therein the attribute representing the characteristic of the substance of the content, such as a characteristic keyword, or the like, indicating the substance of the content. The item of the evaluation is an area that stores therein the evaluation value with respect to the content. In the embodiment, it is assumed that the evaluation value with respect to the content is the number of times the content is emphasized in a social networking service, or the like. In the item of the evaluation, the number of times the content is emphasized is stored. The item of the collection date and time is an area that stores therein the date and time on which the content is collected. For example, the example illustrated in FIG. 6 indicates that, regarding the content with the article ID of "123456", the substance of the content is "XXXX", the classification is "business", the attribute is "photograph, and . . . ", the evaluation is "793", and the date and time on which the content is collected is 18:00 on Jun. 29, 2016.

The reaction information 34 is data that stores therein information related to a reaction to the displayed content.

FIG. 7 is a schematic diagram illustrating an example of the data structure of the reaction information. As illustrated in FIG. 7, the reaction information 34 includes items, such as the "user ID", the "task ID", the "content ID", the "customer ID", the "reaction level", and the like. Furthermore, each of the items included in the reaction information 34 illustrated in FIG. 7 is an example and another item may also be included.

The item of the user ID is an area that stores therein the user ID of the user who inputs the reaction to the content. The item of the task ID is an area that stores therein the task ID of the task in which the reaction has been input. The item of the content ID is an area that stores therein the content ID of the content in which the reaction has been input. The item of the customer ID is an area that stores therein the customer ID of the customer from whom the reaction to the content is obtained. In the item of the customer ID, if a reaction to the content is received from a customer, the customer ID of the customer is stored, whereas, if a reaction to the content is received from an insurance salesperson, "-" is stored. The item of the reaction level is an area that stores therein the level of a reaction designated with respect to the content. In the embodiment, the level indicating a fine content is stored. For example, the example illustrated in FIG. 7 indicates that, the insurance salesperson with the user ID of "001" receives the reaction with the reaction level of "5" from the customer with the customer ID of "0001" in the task with the task ID of "00006" with respect to the task with the content ID of "123456". Furthermore, the example illustrated in FIG. 7 indicates that the insurance salesperson with the user ID of "001" designates the reaction with the reaction level of "3" in the task with the task ID of "00006" with respect to the task with the content ID of "123457".

The user attribute information 35 is the data that stores therein information related to the attribute of a user, such as the target of the interest of the insurance salesperson who is a user.

FIG. 8 is a schematic diagram illustrating an example of the data structure of the user attribute information. As illustrated in FIG. 8, the user attribute information 35 includes items, such as the "user ID", the "attribute", and the like. Furthermore, each of the items included in the user attribute information 35 illustrated in FIG. 8 is an example and another item may also be included.

The item of the user ID is an area that stores therein the user ID of the user related to the stored attribute. The item of the attribute is an area that stores therein the attribute of the user, such as the target of the interest of the user, or the like. For example, the example illustrated in FIG. 8 indicates that the attribute of the insurance salesperson with the user ID of "001" is "photograph, vehicle, and . . . ". Furthermore, in the item of the attribute, the degree of interest indicating the attribute of the user and the level of interest, such as the target of the interest of the user, or the like, may also be stored.

The customer attribute information 36 is the data that stores therein information related to the attribute of a customer, such as the target of the interest of the customer.

FIG. 9 is a schematic diagram illustrating an example of the data structure of the customer attribute information. As illustrated in FIG. 9, the customer attribute information 36 includes items, such as the "customer ID", the "attribute", and the like. Furthermore, each of the items included in the customer attribute information 36 illustrated in FIG. 9 is an example and another item may also be included.

The item of the customer ID is an area that stores therein the customer ID of the customer related to the stored attribute. The item of the attribute is an area that stores therein the attribute of the customer, such as the target of the interest of the customer, or the like. For example, the example illustrated in FIG. 9 indicates that the attribute of the customer with the customer ID of "0001" is "photograph, golf, and . . . ". Furthermore, in the item of the attribute, the degree of interest indicating the attribute of the customer and the level of interest, such as the target of the interest of the customer, or the like, may also be stored.

The control unit 22 is a device that controls the server device 12. As the control unit 22, an electronic circuit, such as a central processing unit (CPU), a micro processing unit (MPU), and the like, or an integrated circuit, such as an application specific integrated circuit (ASIC), a field programmable gate array (FPGA), and the like, may be used. The control unit 22 includes an internal memory that stores therein control data and programs in which various kinds of procedures are prescribed, whereby the control unit 22 performs various kinds of processes. The control unit 22 functions as various kinds of processing units by various kinds of programs being operated. For example, the control unit 22 includes a display control unit 50, a reception unit 51, a registration unit 52, a collecting unit 53, and a specifying unit 54.

The display control unit 50 controls a display of various kinds of information. For example, when the display control unit 50 receives an access from the user terminal 11, the display control unit 50 performs control of sending information on various kinds of operation screens to the user terminal 11 corresponding to the access source and displaying the operation screens on the user terminal 11 corresponding to the access source. For example, the display control unit 50 displays the login screen on the user terminal 11 in accordance with an access from the user terminal 11 and receives a login by allowing a user to input the user ID. If the login has been successful, the display control unit 50 controls a display of various kinds of screens, such as operation screens, or the like, on the user terminal 11. For example, the display control unit 50 displays, on the user terminal 11, a schedule registration screen on which the schedule of the insurance salesperson with the input user ID is registered.

The reception unit 51 receives various kinds of operations. For example, by receiving various kinds of operation information on the operation screens from the user terminal 11, the reception unit 51 receives various kinds of operations. For example, the reception unit 51 receives various kinds of operations related to the registration of the schedule in accordance with the operation performed on the schedule registration screen. For example, the reception unit 51 receives an instruction to register various kinds of actions, such as a morning meeting, a preparation for visiting a customer, a visit to a customer, a plan to make a phone call to the customer, making a daily report, or the like, as a task performed by the insurance salesperson in the schedule. For example, the reception unit 51 receives the designation of the type of the task registered in the schedule, the start date and time of the task, and the end date and time of the task. Furthermore, if the task is the action related to a customer, such as a customer visit, or the like, the reception unit 51 receives the designation of the target customer.

The registration unit 52 performs various kinds of registration. For example, if the registration unit 52 receives an instruction to register a task in the schedule from the reception unit 51, the registration unit 52 registers, in the storage unit 21, the information related to the task that is instructed to be registered. For example, the registration unit 52 attaches a unique task ID to the task that is instructed to be registered. Then, the registration unit 52 registers, in the schedule information 32, the user ID of the insurance salesperson who has registered the task, the task ID, the type of the task, the start date and time of the task, and the end date and time of the task. Furthermore, if the customer targeted for the task is designated, the registration unit 52 registers the customer ID of the customer targeted for the task in the schedule information 32, whereas, if the customer targeted for the task is not designated, the registration unit 52 registers the customer ID as "-" in the schedule information 32.

Consequently, the registered schedule is stored in the schedule information 32. In the schedule information 32 illustrated in FIG. 5, the schedule of the insurance salesperson with the user ID of "001" is registered. In the example illustrated in FIG. 5, regarding the insurance salesperson with the user ID of "001", the task of the "morning meeting" with the task ID of "00001" is registered in the schedule between 9:00 and 9:30 on Jun. 30, 2016. Furthermore, regarding the insurance salesperson with the user ID of "001", the task of the "phone" with the task ID of "00002" is registered in the schedule between 10:00 and 11:00 on Jun. 30, 2016. Furthermore, regarding the insurance salesperson with the user ID of "001", the task of the "visit preparation" with the task ID of "00003" is registered in the schedule between 11:00 and 12:00 on Jun. 30, 2016. Furthermore, regarding the insurance salesperson with the user ID of "001", the task of the "lunch" with the task ID of "00004" is registered in the schedule between 12:00 and 12:30 on Jun. 30, 2016. Furthermore, regarding the insurance salesperson with the user ID of "001", the task of the "move" with the task ID of "00005" is registered in the schedule between 12:40 and 13:30 on Jun. 30, 2016. Furthermore, regarding the insurance salesperson with the user ID of "001", the task of the "visit" with the task ID of "00006" is registered in the schedule between 13:30 and 15:00 on Jun. 30, 2016. Furthermore, regarding the insurance salesperson with the user ID of "001", the task of the "move" with the task ID of "00007" is registered in the schedule between 15:10 and 16:00 on Jun. 30, 2016. Furthermore, regarding the insurance salesperson with the user ID of "001", the task of the "visit" with the task ID of "00008" is registered in the schedule between 16:00 and 17:00 on Jun. 30, 2016. Furthermore, regarding the insurance salesperson with the user ID of "001", the task of the "move" with the task ID of "00009" is registered in the schedule between 17:00 and 17:40 on Jun. 30, 2016. Furthermore, regarding the insurance salesperson with the user ID of "001", the task of the "daily report" with the task ID of "00010" is registered in the schedule between 17:40 and 18:10 on Jun. 30, 2016.

The collecting unit 53 performs various kinds of collection. For example, the collecting unit 53 collects the content, such as an article, or the like, from a content provider that provides the content, such as an article, or the like. An example of the provider of the content includes a news agency that communally distributes articles; a newspaper publishing company of national newspapers, block newspapers, local newspapers, or sport newspapers; a publishing company of specialized magazines or business magazines; a television station; a radio station; or the like. For example, a contract related to providing the content is made with a content provider. The collecting unit 53 periodically collects the content from the contracted content provider.

Furthermore, the collecting unit 53 collects an evaluation of the content. For example, if the content provider receives an evaluation of, for example, "like", or the like with respect to the content, the collecting unit 53 collects the number of times the content is evaluated as good as the evaluation from the content provider. Furthermore, if the collecting unit 53 receives evaluations indicating that the content is good and the evaluations indicating that the content is not good, the collecting unit 53 may also collect both the number of evaluations indicating good and evaluations indicating bad and may also use, as the evaluation, the value obtained by subtracting the number of evaluations indicating bad from the number of evaluations indicating good. Furthermore, if the content provider posts the content on, for example, a social networking service, the collecting unit 53 may also collect the evaluation with respect to the content from the social networking service. An example of the social networking service includes, for example, Facebook, Twitter, Hatena, Google+, or the like. In this case, the collecting unit 53 may also collect, as the evaluation, the number of times the content of retweet, or the like, is quoted. The evaluation of the content may also be specified by the scoring or the like based on the number of evaluations indicating good or the number of times the content is quoted.

Furthermore, the collecting unit 53 may also collect not only the latest content but also the past content from the content provider.

The registration unit 52 registers, in the content information 33, the content collected by the collecting unit 53 or the information related to the content, such as the evaluation with respect to the content. For example, the registration unit 52 attaches a unique article ID to the collected content. Then, the registration unit 52 registers, in the content information 33, the collected content or the information related to the content, such as the evaluation with respect to the collected content, or the like. If the classification or the attribute is attached to the collected content, the registration unit 52 registers the classification or the attribute attached to the content in the content information 33. If the classification or the attribute is not attached to the collected content, the registration unit 52 specifies the classification or the attribute and then registers the collected content in the content information 33. For example, if the attribute is not attached, the registration unit 52 extracts keywords from the content and registers each of the extracted keywords as the attribute of the content in the content information 33. Furthermore, for example, if the classification is not attached, the registration unit 52 specifies the classification included in the content from the keywords of the content and registers the content in the content information 33. For example, the registration unit 52 compares the keywords of the unclassified content with the keywords of the classified content, specifies the classification having the most matched keywords, and registers the content in the content information 33. Furthermore, the method of specifying the classification or the attribute is not limited to this and any method may also be used.

Figure 10:
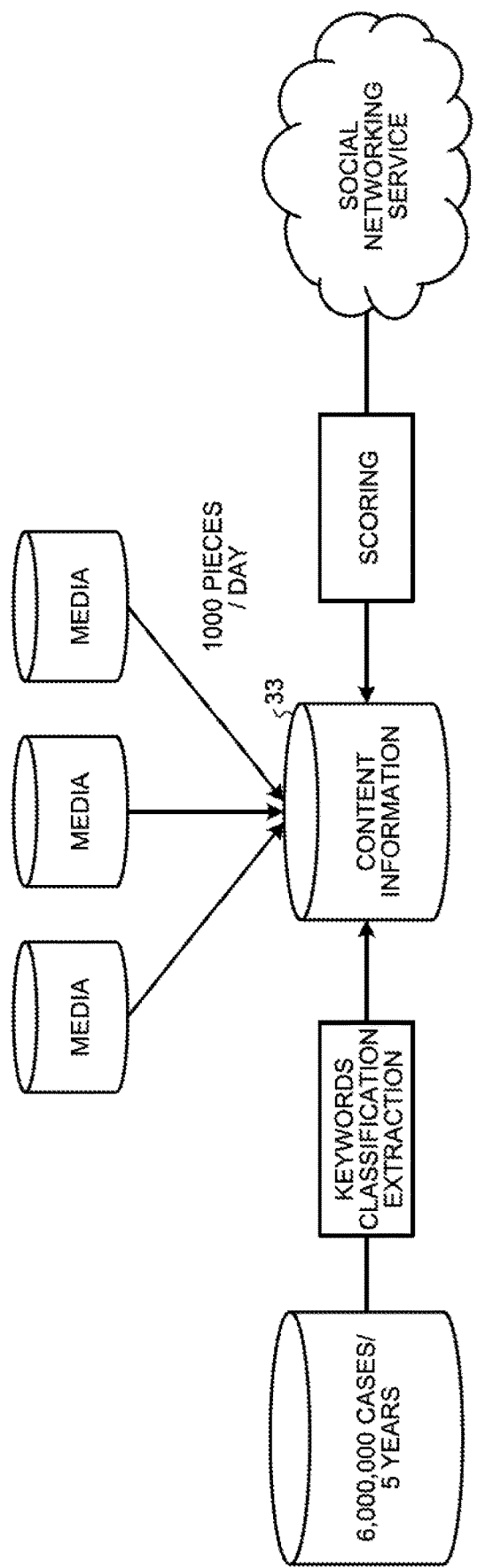
FIG. 10 is a schematic diagram illustrating an example of the registration of content.

FIG. 10 is a schematic diagram illustrating an example of the registration of content. For example, regarding the content, such as articles collected in the past five years, the keyword and the classification are extracted and registered in the content information 33. Furthermore, 1000 pieces of content are collected from each of the media, such as news agencies, newspaper publishing companies, publishing companies, television stations, radio stations, or the like every day and registered in the content information 33. Furthermore, the number of times the content is evaluated good or the number of times the content is quoted is collected from the social networking service, the evaluation with respect to the content is calculated based on the scoring, or the like, and the calculation result is stored in the content information 33.

The reception unit 51 receives a predetermined operation that instructs to display the schedule. Here, in the schedule system 10 according to the embodiment, when the schedule is displayed for a user, the content is displayed in accordance with the task registered in the schedule.

When the display control unit 50 receives a predetermined operation that instructs to display the content from the reception unit 51, the display control unit 50 displays, on the user terminal 11, the content screen on which the content related to each of the tasks registered in the schedule together with the schedule.

Figure 11:
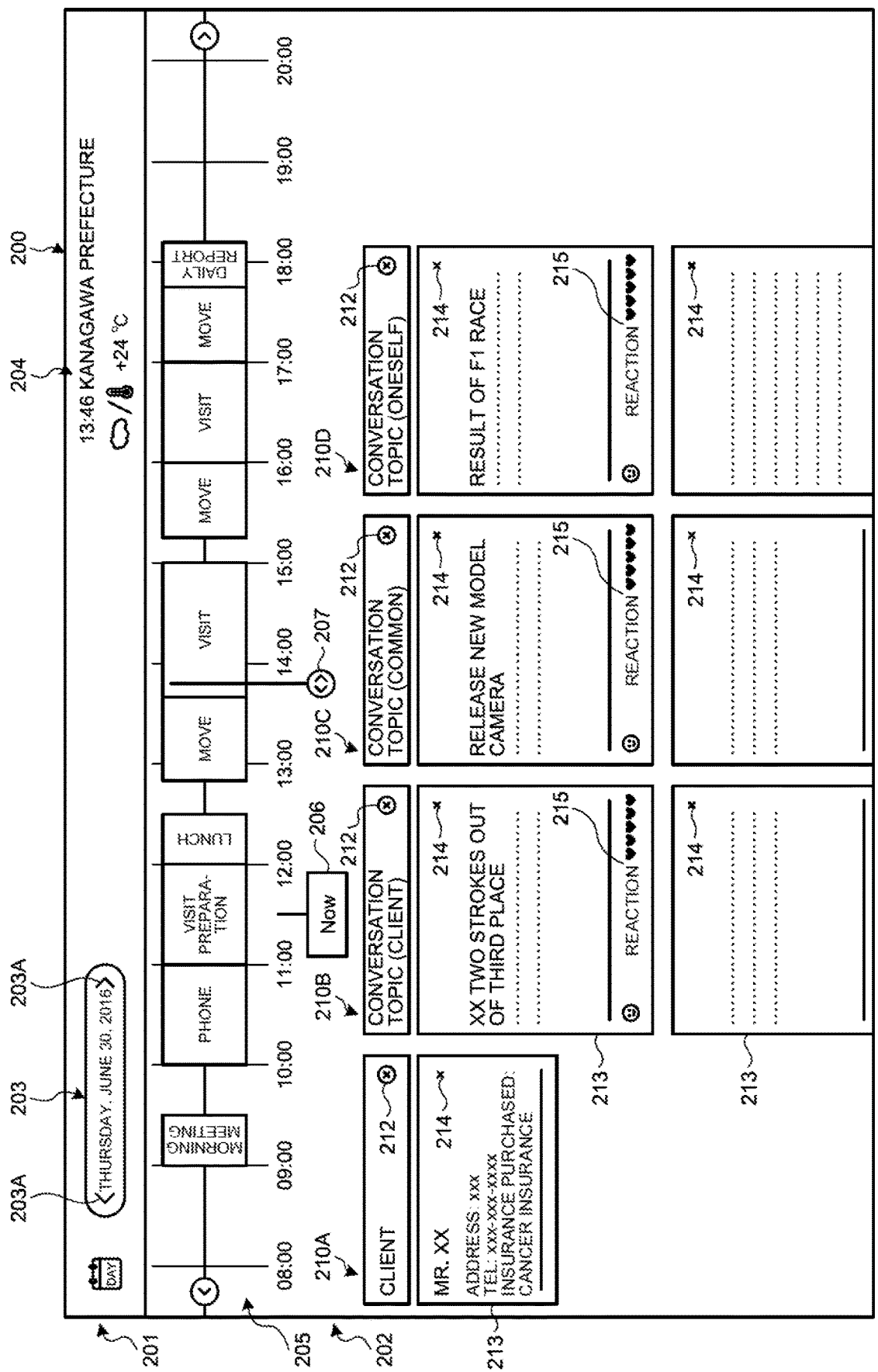
FIG. 11 is a schematic diagram illustrating an example of a content screen.

FIG. 11 is a schematic diagram illustrating an example of a content screen. The example illustrated in FIG. 11 indicates an example of the content screen displayed on the user terminal 11. A content screen 200 includes a header area 201 provided in the upper portion of the content screen 200 and a main area 202. The header area 201 includes a date area 203 that is used to display the date and a weather display area 204 that is used to display weather information.

In the date area 203, the date of a logged in date is displayed as the initial display. Furthermore, the date area 203 includes switch icons 203A on both sides of the date and the date to be displayed can be changed by the switch icon 203A.

The display control unit 50 displays, on the main area 202, time schedule of the date displayed on the date area 203. For example, the display control unit 50 reads, from the schedule information 32, the task of the insurance salesperson with the logged in user ID on the date of the start date and time or the end date and time displayed on the date area 203. Then, the display control unit 50 displays, on the main area 202, a schedule bar 205 in which the times are arranged in the lateral direction.

Furthermore, the display control unit 50 displays, on the schedule bar 205 for each read task, at the position in the length associated with the time zone of each of the tasks, the bar in which the title associated with the task is displayed. Furthermore, the display control unit 50 displays a mark 206 indicating the current date and time at the position of the time associated with the current system date and time of the schedule bar 205.

The reception unit 51 receives the designation of the time. For example, the reception unit 51 receives the designation of the time due to the designation of the position with respect to the schedule bar 205. The display control unit 50 displays a pointer 207 indicating the designated time. The reception unit 51 may also receive the designation of the time based on a move of the pointer 207.

The specifying unit 54 performs various kinds of specifications. For example, the specifying unit 54 specifies the task associated with the designated time in accordance with the time designated. For example, the specifying unit 54 specifies the task in which the time at the position designated in the schedule bar 205 is included in the range between the start date and time and the end date and time. In the example illustrated in FIG. 11, because 13:45 is designated, the visit task including 13:45 is specified. Furthermore, the reception unit 51 may also receive the designation of the task based on the position designated on the schedule bar 205. In this case, the specifying unit 54 specifies the task at the designated position on the schedule bar 205.

The specifying unit 54 specifies whether the specified task is the task related to the contact to be performed on the contact destination. For example, if the specified task is a communication task or a visit task with respect to the contact destination, the specifying unit 54 specifies that the task is related to the contact to be performed on the contact destination. In the embodiment, if the specified task is the phone task or the visit task, the specifying unit 54 specifies that the task is related to the contact with respect to the contact destination. If the specified task is the contact task with respect to the contact destination, the specifying unit 54 specifies the contact destination. For example, the specifying unit 54 reads, from the schedule bar 205, the item of the customer ID of the specified task and specifies the customer ID of the customer corresponding to the contact destination. In the example illustrated in FIG. 11, as the contact destination of the visit task including 13:45, the customer with the customer ID of "0001" is specified.

The specifying unit 54 specifies the attribute about the target of interest of the customer corresponding to the contact destination. For example, the specifying unit 54 reads, from the customer attribute information 36, the attribute associated with the customer ID of the customer corresponding to the contact destination and specifies the attribute of the customer. In the example illustrated in FIG. 11, as the attribute of the customer with the customer ID of "0001", "photograph", "golf", and . . . are specified. Furthermore, the specifying unit 54 specifies the attribute about the target of interest of the user registered in the schedule on the schedule bar 205. For example, the specifying unit 54 reads, from the user attribute information 35, the attribute associated with the user ID of the logged in insurance salesperson and specifies the attribute of the logged in insurance salesperson. For example, if the user ID of the logged in insurance salesperson is "001", "photograph", "vehicle", and . . . are specified as the attribute of the logged in insurance salesperson.

The specifying unit 54 evaluates the degree of common between the attribute of the customer corresponding to the contact destination and the attribute of the logged in insurance salesperson and specifies the attribute that has a commonality in accordance with the evaluation result. For example, the specifying unit 54 specifies the common attribute between the attribute of the customer corresponding to the contact destination and the attribute of the logged in insurance salesperson. Furthermore, if the degree of interest is stored in the item of the attribute in the customer attribute information 36 or the user attribute information 35, the specifying unit 54 may also specify the attribute that has a commonality by considering the degree of interest. For example, if the common attribute is present between the attribute of the customer corresponding to the contact destination and the attribute of the logged in insurance salesperson, the specifying unit 54 multiplies the degree of interest of the customer by the degree of interest of the user. The specifying unit 54 may also specify, as the attributes that have a commonality, the attributes in each of which the value obtained by multiplying the degree of interest of the customer by the degree of interest of the user is equal to or greater than a predetermined threshold or the attributes in each of which the multiplied value is up to the top predetermined level.

The display control unit 50 controls, based on the attribute specified by the specifying unit 54, the information that is displayed by being associated with the task specified by the specifying unit 54. For example, in accordance with the task specified by the specifying unit 54, the display control unit 50 controls the content displayed on the main area 202. For example, if the task specified by the specifying unit 54 is the phone task or the visit task, the display control unit 50 displays the information related to the customer corresponding to the contact destination on the main area 202. Furthermore, the display control unit 50 displays, on the main area 202, the content associated with the attribute of the insurance salesperson, the content associated with the attribute common to the insurance salesperson and the customer, and the content associated with the attribute of the customer.

In the example illustrated in FIG. 11, in the lower portion of the schedule bar 205 in the main area 202, display areas 210A to 210D are arranged in the lateral direction. In the display area 210A, the information related to the customer corresponding to the contact destination is displayed. In the display area 210B, the content associated with the attribute of the customer is displayed. In the display area 210C, the content associated with the attribute common to the insurance salesperson and the customer is displayed. In the display area 210D, the content associated with the attribute of the insurance salesperson is displayed.

For example, the display control unit 50 searches the customer information 31 by using the customer ID of the customer corresponding to the contact destination as a key, reads the target customer name, the phone number, the purchased insurance, and the like, and displays the searched result on the display area 210A.

Furthermore, the display control unit 50 reads, from the content information 33 by using the attribute of the customer corresponding to the contact destination, the content in which many search keys are included in the item of the attribute and the evaluation is high. For example, the display control unit 50 applies weighting to the evaluation value of the content by increasing the weight as the number of search keys included in the item of the attribute is greater and reads the content in the descending order of the weighted evaluation values. The display control unit 50 displays the read content on the display area 210B. Furthermore, the method of obtaining the content to be displayed is an example and is not limited to this. For example, the display control unit 50 may also read the content in which the number of search keys included in the item of the attribute is equal to or greater than a predetermined number and may also display the read content in the descending order of the evaluation values. Furthermore, the display control unit 50 may also further apply the weighting to the evaluation value of the content by increasing the weight as the collected date and time is the latest and may also sequentially read the new content that has a lot of search keys in the item of the attribute and that has a high evaluation value.

Furthermore, the display control unit 50 may also apply the weighting to the evaluation value of the content for each attribute by increasing the weight as the collected date and time is the latest; may also sequentially read, for each attribute, the new content having an evaluation value, and may also display the content in the order of the evaluation values. The display control unit 50 similarly reads, from the content information 33 by using the attributes common to the insurance salesperson and the customer as the search key, the content that includes a lot of search keys in the item of the attribute and that has a high evaluation value and displays the read content on the display area 210C. Furthermore, the display control unit 50 similarly reads, from the content information 33 by using the attribute of the insurance salesperson as a search key, the content that includes a lot of search keys in the item of the attribute and that has a high evaluation value and displays the read content on the display area 210D. Furthermore, the display control unit 50 compares the content to be displayed and displays, if a plurality of the pieces of the same content are present, only a single piece of the content.

Consequently, for example, in the display area 210B on the content screen 200 illustrated in FIG. 11, the content related to the attribute of the "golf" of the customer is displayed. In the display area 210C on the content screen 200, the content related to the attribute of "photograph" common to the insurance salesperson and the customer is displayed. In the display area 210D on the content screen 200, the content related to the attribute of "vehicle" of the insurance salesperson is displayed.

By referring to the content screen 200, the insurance salesperson can provide a conversation topic appropriate for the customer; therefore, it is possible for the insurance salesperson to easily construct the trust relationship with the customer. For example, by talking about the content displayed on the display area 210B, the insurance salesperson can have a conversation matched with the interest of the customer and thus easily construct the trust relationship with the customer. Furthermore, by talking about the content displayed on the display area 210C, the insurance salesperson can have a conversation containing the interest common to both the customer and the insurance salesperson and thus easily construct the trust relationship with the customer. Furthermore, by talking about the content displayed on the display area 210D, the insurance salesperson can have a conversation containing the interest of the insurance salesperson even though the current interest of the customer is low. Consequently, the insurance salesperson can arouse the customer's interest in the new attribute and thus easily construct the trust relationship with the customer.

Deletion buttons 212 are provided in the display areas 210A to 210D.

If the deletion button 212 is selected, the display control unit 50 deletes, from the main area 202, one of the display areas 210A to 210D in which the deletion button 212 is selected.

In the display areas 210A to 210D, a display area 213 on which the content is displayed is provided for each content. Then, a deletion button 214 is provided in each of display areas 213.

If the deletion button 214 is selected, the display control unit 50 deletes, from the display area 210, the display area 213 that is related to the content and in which the deletion button 214. Then, the display control unit 50 displays the undisplayed content.

Furthermore, in the display area 213, a reaction level button 215 that can designate the reaction level indicating the level of the reaction with respect to the content. The reaction level button 215 can designate the reaction level from among the levels of 0 to 5.

The insurance salesperson designates the reaction level button 215 with respect to the content, between the content displayed on the display areas 210B and 210C, from which a reaction of interest is obtained from the customer. Furthermore, the insurance salesperson designates, in association with the own attribute, the reaction level button 215 with respect to the content the insurance salesperson interested in from the pieces of the content displayed on the display area 210D.

The registration unit 52 registers, in the reaction information 34, the information related to the content in which the reaction level has been designated by the reaction level button 215. For example, if the reaction level button 215 in the display area 213 related to the content displayed in the display areas 210B and 210C is designated, the registration unit 52 performs the following process. Namely, the registration unit 52 registers, in the reaction information 34, the designated reaction level together with the user ID of the logged in insurance salesperson, the task ID of the task, the content ID of the content, and the customer ID of the customer corresponding to the contact destination. Furthermore, for example, if the reaction level button 215 in the display area 213 related to the content displayed in the display area 210D is designated, the registration unit 52 performs the following process. Namely, the registration unit 52 registers, in the reaction information 34, the designated reaction level together with the user ID of the logged in insurance salesperson, the task ID of the task, and the content ID of the content.

Consequently, in the reaction information 34, the achievement indicating what kind of reaction is received with respect to the content.

The specifying unit 54 specifies the attribute, such as the target of the interest of the insurance salesperson and the customer, or the like, for each predetermined time period (for example, three months) based on the reaction information 34. Then, the specifying unit 54 updates the user attribute information 35 and the customer attribute information 36 based on the specified attribute. For example, the specifying unit 54 reads, from the content information 33, the attribute of the content ID associated with the customer ID stored in the reaction information 34. The specifying unit 54 performs, for each attribute, addition of the reaction level, which is stored in the reaction information 34, with respect to the content including the subject attribute and adds the attribute in which the reaction level is equal to or greater than a threshold to the attribute of the customer corresponding to the contact destination in the customer attribute information 36. Furthermore, the specifying unit 54 reads, from the content information 33, the attribute of the content ID in which the customer ID is not stored in the reaction information 34. The specifying unit 54 performs, for each attribute, the reaction level, which is stored in the reaction information 34, with respect to the content including the subject attribute and adds the attribute in which the reaction level is equal to or greater than a threshold to the attribute of the logged in user in the user attribute information 35. Consequently, if a higher reaction level is received with respect to the content having the same attribute, the attribute with the higher reaction level is added and registered.

Flow of a Process

Figure 12:
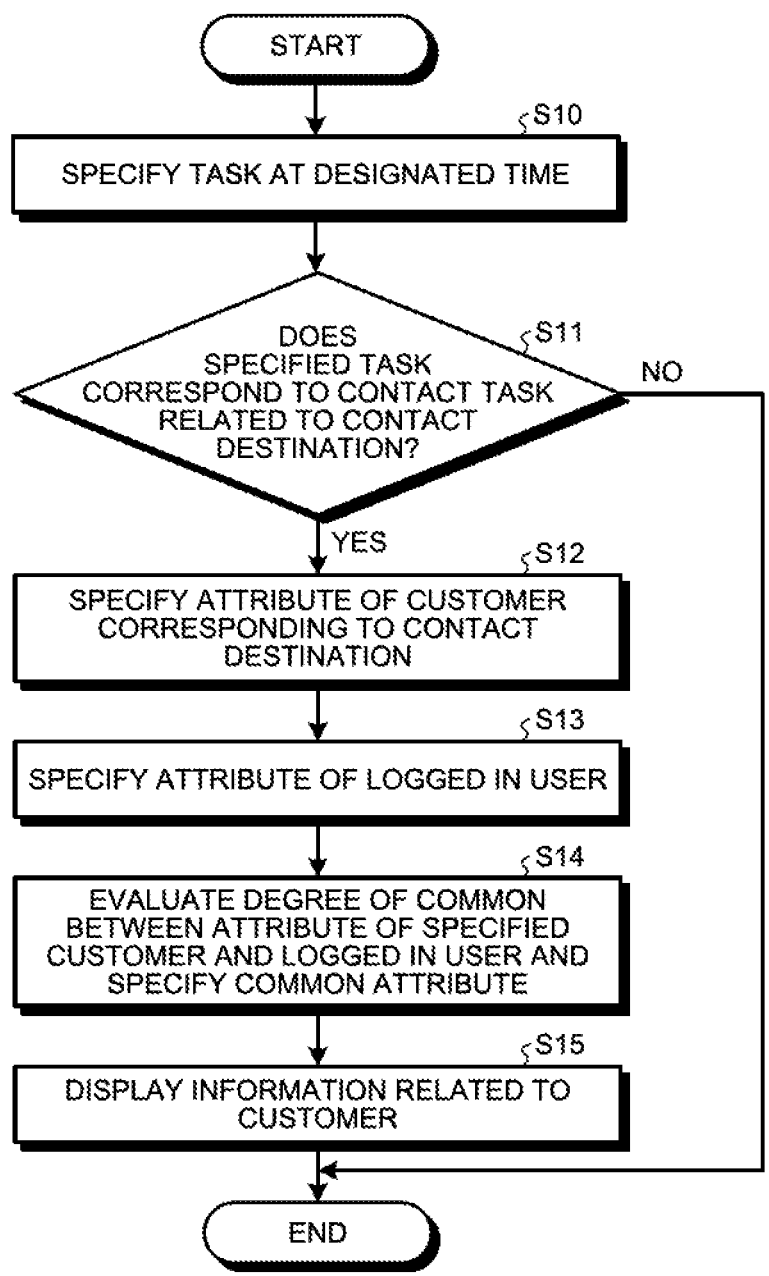
FIG. 12 is a flowchart illustrating the flow of a display control process.

In the following, the flow of a display control process in which the server device 12 according to the embodiment controls the content displayed on the content screen 200 will be described. FIG. 12 is a flowchart illustrating the flow of the display control process. The display control process illustrated in FIG. 12 is performed at a predetermined timing, for example, the timing in which an operation of designating the time with respect to the schedule bar 205 is received.

The specifying unit 54 specifies the task at the time at the position designated by the schedule bar 205 included in the range of the start date and time and the end date and time (Step S10). The specifying unit 54 determines whether the specified task is the task related to the contact with respect to the contact destination (Step S11). For example, if the specified task is the phone task or the visit task, the specifying unit 54 determines that the specified task is the task related to the contact with respect to the contact destination. If the specified task is not the task related to the contact with respect to the contact destination (No at Step S11), the specifying unit 54 ends the process.

In contrast, if the specified task is the task related to the contact with respect to the contact destination (Yes at Step S11), the specifying unit 54 specifies, from the customer attribute information 36, the attribute of the customer corresponding to the contact destination (Step S12). The specifying unit 54 specifies, from the user attribute information 35, the attribute of the insurance salesperson who is the logged in user (Step S13). The specifying unit 54 evaluates the degree of common between the attribute of the customer corresponding to the contact destination and the attribute of the logged in insurance salesperson and specifies the common attribute in accordance with the evaluation result (Step S14).

The display control unit 50 displays the information related to the customer corresponding to the contact destination on the display area 210A (Step S15). The display control unit 50 displays the content associated with the attribute in the main area 202 in accordance with the specified task (Step S16) and ends the process. For example, the display control unit 50 displays the content associated with the attribute of the insurance salesperson on the display area 210B. Furthermore, the display control unit 50 displays, on the display area 210C, the content associated with the attribute common to the insurance salesperson and the customer. Furthermore, the display control unit 50 displays, on the display area 210D, the content associated with the attribute of the customer.

Effects

As described above, if the task related to the contact with respect to a first contact destination (customer) is included in a schedule of a first user (here, an insurance salesperson) stored in the storage unit 21, the server device 12 specifies an attribute that has a commonality in accordance with an evaluation result related to the degree of common between the attribute information registered related to the first user and the attribute information registered related to the first contact destination. The server device 12 controls, based on the specified attribute, the information that is displayed by being associated with the task. Consequently, because the insurance salesperson who has referred to the displayed information can provide an appropriate conversation topic, the server device 12 can support the construction of the trust relationship with the contact destination.

Furthermore, the server device 12 displays the information searched based on the specified attribute. Consequently, the server device 12 can display various kinds of information searched based on the attributes.

Furthermore, the server device 12 uses the task related to the contact with respect to the first contact destination as a communication task or a visit task with respect to the first contact destination. Consequently, if the communication task or the visit task with respect to the contact destination is present, the server device 12 can display the information that can be used for the topic of conversation with the contact destination and can support the construction of the trust relationship with the contact destination.

Furthermore, the server device 12 displays the information by associating the task designated from among the tasks included in the schedule of the first user. Consequently, the server device 12 can display, in an easy-to-understand manner, the association relationship between the displayed information and the task that uses the displayed information.

Furthermore, the server device 12 can designate the task by designating the task included in the schedule of the first user on a display screen or by designating the time associated with the task. Consequently, the server device 12 can easily designate the task in which the content is to be displayed.

Furthermore, in the server device 12, the displayed information is information with which the scoring result obtained from a social networking service is associated and with which a higher scoring result is associated. Consequently, the server device 12 can display the information on the high scoring result in the social networking service.

[b] Second Embodiment

In the above explanation, a description has been given of the embodiment of the device disclosed in the present invention; however, the present invention can be implemented with various kinds of embodiments other than the embodiment described above. Therefore, another embodiment included in the present invention will be described below.

For example, in the embodiment described above, an example has been described of the phone task with respect to the customer as the communication task with respect to the contact destination. However, the embodiment is not limited to this. For example, any task, such as a mail task with respect to a customer, or the like, may also be used for the communication task with respect to the contact destination as long as the task is a work with respect to the contact destination.

Furthermore, in the embodiment described above, an example has been described of a case of managing the schedule of the insurance salesperson as a user. However, the embodiment is not limited to this. For example, any user, such as sales staff who engages in various kinds of business with respect to the access destination, such as a customer, or the like, may also be appropriate as long as a user performs a work on the contact destination.

Furthermore, in the embodiment described above, an example has been described of a case of specifying an attribute that has a commonality in accordance with an evaluation result related to the degree of common between the attribute information registered related to the insurance salesperson and the attribute information registered related to the customer corresponding to the contact destination. However, the embodiment is not limited to this. For example, the specifying unit 54 may also further select, from among the pieces of the attribute information on the customer corresponding to the contact destination, in accordance with the reaction information that is related to the customer corresponding to the contact destination and that is registered by being associated with the attribute information, the attribute information in which the degree of common with respect to the attribute information registered related to the insurance salesperson is evaluated. For example, from among the common attributes between the attributes of the customer corresponding to the contact destination and the attributes of the logged in insurance salesperson, the specifying unit 54 may also specify the attributes in each of which the reaction level of the customer corresponding to the contact destination is equal to or greater than the predetermined threshold or specify the attribute with the highest reaction level of the customer corresponding to the contact destination. Consequently, the server device 12 can display the content related to the attribute in which the reaction of the customer corresponding to the contact destination is the highest from among the common attributes.

Furthermore, in the embodiment described above, an example has been described of a case of displaying and providing the character content, such as an article, or the like. However, the embodiment is not limited to this. The content to be provided may also be a video or a voice. For example, voice data of the radio may also be collected as the content from AM/FM radio broadcasting stations, voice sharing services, or the like. Furthermore, video data may also be collected as the content from television broadcasting stations or animation sharing services. The registration unit 52 may also perform voice recognition on the video or the voice content, extract a keyword from the text data subjected to the voice recognition, and specify the attribute or the classification of the video or the voice content. If the attribute or the classification of the content is attached to the video or voice content, the attribute or the classification of the attached content may also be used.

Furthermore, in the embodiment described above, an example has been described of a case of separately displaying the content associated with the attribute of the insurance salesperson, the content associated with the attribute common to the insurance salesperson and the customer, and the content associated with the attribute of the customer in each of the display areas. However, the embodiment is not limited to this. For example, the display control unit 50 may also collectively display, on a single display area, the information that is to be displayed based on the attribute. In this case, the display control unit 50 may also display, with priority, the information that is to be displayed based on the specified attribute that has the commonality by giving priority over another pieces of information associated with an attribute that has no commonality. For example, the display control unit 50 may also control the display such that the content associated with the attribute common to the insurance salesperson and the customer is displayed, with priority, on the single display area. Furthermore, the display control unit 50 may also display the information that is displayed based on the specified attribute that has the commonality such that the information can be distinguished from another piece of information associated with the attribute that has no commonality. For example, the display control unit 50 may also display, on the single display area, the content associated with the attribute that is common to the insurance salesperson and the customer, the content associated with the attribute of the insurance salesperson, and the content associated with the attribute of the customer in a distinguishable manner by changing the color of the content.

Figure 13A:
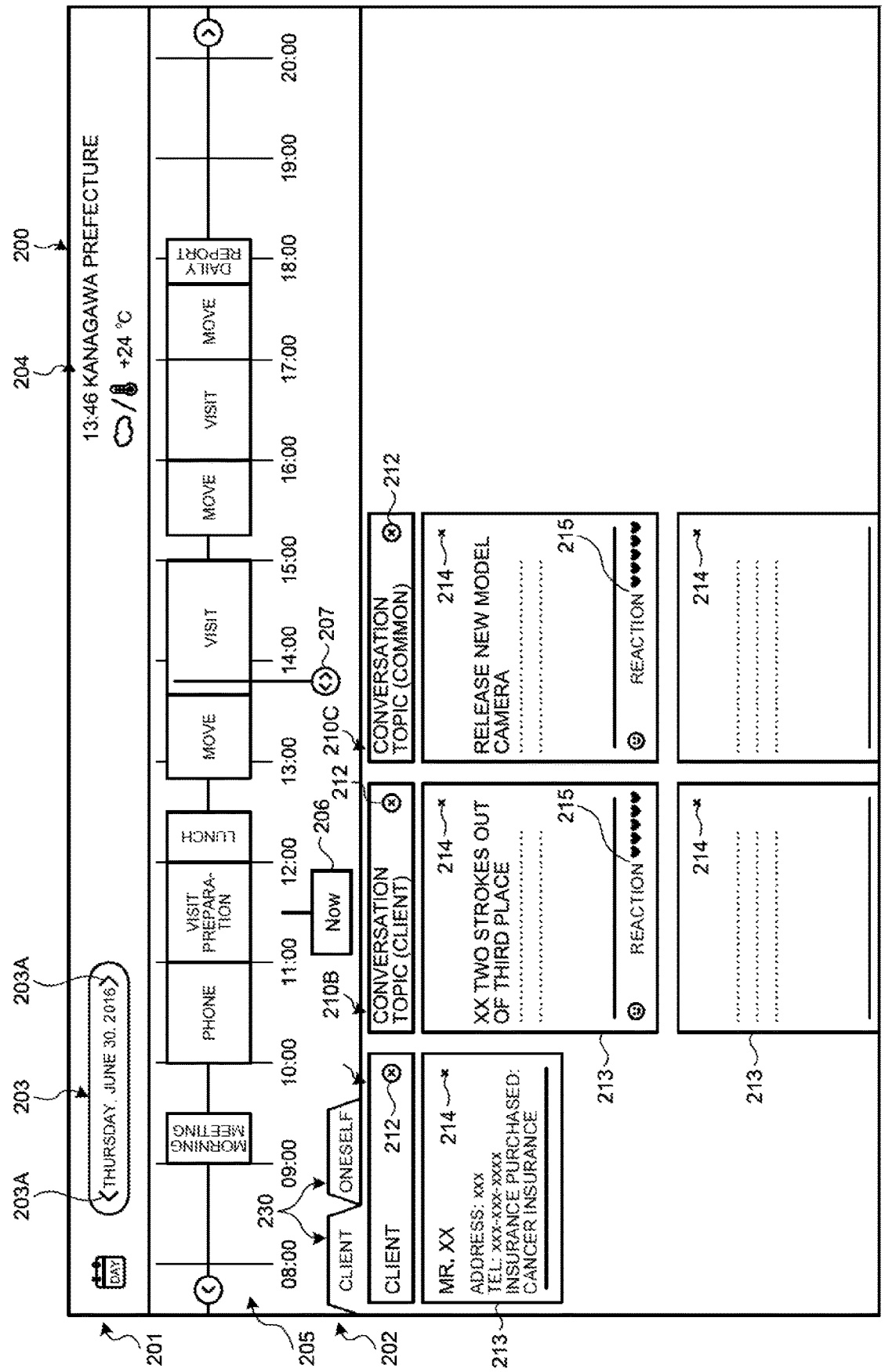
FIG. 13A is a schematic diagram illustrating an example of a content screen.

Furthermore, in the embodiment described above, an example has been described of a case of separately displaying the content associated with the attribute of the insurance salesperson, the content associated with the attribute common to the insurance salesperson and the customer, and the content associated with the attribute of the customer on a single screen by dividing the display area. However, the embodiment is not limited to this. For example, the display control unit 50 may also display the content associated with the attribute of the insurance salesperson, the content associated with the attribute common to the insurance salesperson and the customer, and the content associated with the attribute of the customer on the screen by changing the content. FIGS. 13A and 13B are schematic diagram each illustrating an example of the content screen. In the main area 202 on the content screen 200 illustrated in FIG. 13A and FIG. 13B, tabs 230 are provided and it is assumed that the content associated with the attribute of the customer and the content associated with the attribute of the insurance salesperson can be displayed by being switched. In the example illustrated in FIG. 13 A, the tab 230 of "client" is designated and the display areas 210A to display area 210C are displayed. In the example illustrated in FIG. 13B, the tab 230 of "oneself" is designated and both the display area 210A and the display area 210D are displayed. By switching the tabs 230 of "client" and "oneself", the insurance salesperson can easily grasp the content associated with the attribute of the insurance salesperson, the content associated with the attribute common to the insurance salesperson and the customer, and the content associated with the attribute of the customer.

Furthermore, the components of each unit illustrated in the drawings are only for conceptually illustrating the functions thereof and are not always physically configured as illustrated in the drawings. In other words, the specific shape of a separate or integrated device is not limited to the drawings. Specifically, all or part of the device can be configured by functionally or physically separating or integrating any of the units depending on various loads or use conditions. For example, each of the processing units of the display control unit 50, the reception unit 51, the registration unit 52, the collecting unit 53, and the specifying unit 54 may also appropriately be integrated or divided. Furthermore, the display control unit 50, the reception unit 51, the registration unit 52, the collecting unit 53, and the specifying unit 54 may also be separately performed by a plurality of server devices. Furthermore, all or any part of the display control unit 50, the reception unit 51, the registration unit 52, the collecting unit 53, and the specifying unit 54 can be implemented by a CPU and by programs analyzed and executed by the CPU or implemented as hardware by wired logic.

Schedule Management Program

Figure 14:
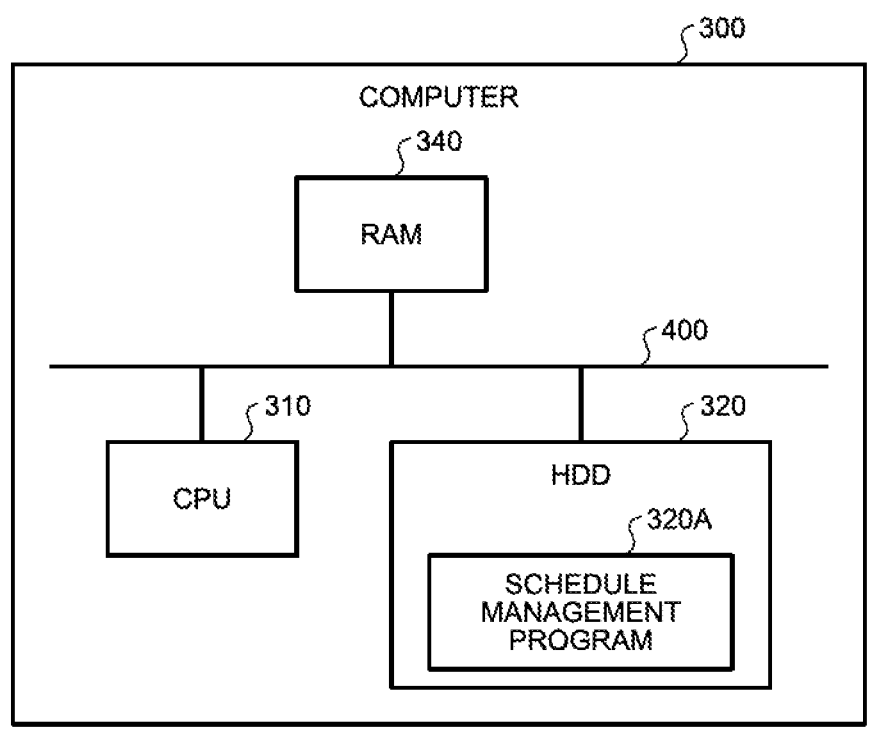
FIG. 14 is a block diagram illustrating a computer that executes a schedule management program.

Furthermore, various kinds of processes described in the above embodiments can be implemented by executing programs prepared in advance in a computer system, such as a personal computer, a workstation, or the like. Accordingly, in the following, a description will be given of an example of a computer system that executes a program having the same function as that performed in the embodiments described above. FIG. 14 is a block diagram illustrating a computer that executes a schedule management program.

As illustrated in FIG. 14, a computer 300 includes a CPU 310, a hard disk drive (HDD) 320, and a random access memory (RAM) 340. Each of the units 310 to 340 is connected via a bus 400.

The HDD 320 stores therein, in advance, a schedule management program 320A that exhibits the same function as that of each of the processing units in the server device 12 according to the embodiment. For example, the HDD 320 stores therein the schedule management program 320A that exhibits the same function as that of the display control unit 50, the reception unit 51, the registration unit 52, the collecting unit 53, and the specifying unit 54 according to the embodiment described above. Furthermore, the schedule management program 320A may also appropriately be separated.

Furthermore, the HDD 320 stores therein various kinds of data. For example, the HDD 320 stores therein an OS or various kinds of data.

Then, the CPU 310 reads the schedule management program 320A from the HDD 320 and executes the schedule management program 320A, whereby the CPU 310 executes the same operation as that executed by each of the display control unit 50, the reception unit 51, the registration unit 52, the collecting unit 53, and the specifying unit 54 according to the embodiment. Namely, the schedule management program 320A executes the same operation as that executed by the display control unit 50, the reception unit 51, the registration unit 52, the collecting unit 53, and the specifying unit 54 according to the embodiment.

Furthermore, the schedule management program 320A described above does not need to be stored in the HDD 320 from the beginning. For example, the program is stored in a "portable physical medium", such as a flexible disk (FD), a compact disk read only memory (CD-ROM), a digital versatile disk (DVD disk), a magneto-optic disk, an IC card, or the like, that is to be inserted into the computer 300. Then, the computer 300 may also read and execute the program from the portable physical medium.

Furthermore, the program may also be stored in "other computers (servers)" or the like connected to the computer 300 via a public circuit, the Internet, a LAN, a WAN, or the like. Then, the computer 300 may also read and execute the program from the other computers According to an aspect of an embodiment of the present invention, an advantage is provided in that it is possible to support the construction of the trust relationship with the contact destination.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a schedule management program that manages a schedule of making a phone call to a customer or visiting to the customer for an insurance salesperson, the schedule management program that causes a computer to execute a process comprising:
storing contents information including an article of a newspaper, customer information, a schedule of the insurance salesperson and a task related to a contact in a storage unit;
specifying, when a task related to the contact with respect to a first customer is included in a schedule of the insurance salesperson stored in a storage unit, a common attribute in accordance with an evaluation result related to the degree of common between attribute information registered related to the insurance salesperson and attribute information registered related to the first customer;
retrieving a content in which many search keys are included in the item of the specified common attribute and the evaluation is high from the storage unit; and
controlling to display the retrieved content being associated with the task for providing an appropriate conversation topic to the customer.

2. The non-transitory computer-readable recording medium according to claim 1, wherein the displayed information is information searched based on the attribute.

3. The non-transitory computer-readable recording medium according to claim 1, wherein the task is a communication task or a visit task with respect to the first customer.

4. The non-transitory computer-readable recording medium according to claim 1, wherein
the task is the task designated from among the tasks included in the schedule of the insurance salesperson, and
the displayed information is displayed by being associated with the designated task.

5. The non-transitory computer-readable recording medium according to claim 4, wherein designating the task is performed by designating the task included in the schedule of the insurance salesperson on a display screen or by designating the time associated with the task.

6. The non-transitory computer-readable recording medium according to claim 1, wherein the displayed information includes one of text information, video information, and voice information.

7. The non-transitory computer-readable recording medium according to claim 1, wherein the displayed information is associated with the evaluation result obtained from a social networking service, and being associated with the higher evaluation result.

8. The non-transitory computer-readable recording medium according to claim 1, wherein information displayed based on the specified common attribute is displayed by being given priority over another piece of information associated with an attribute that is not the common attribute or is displayed so as to be capable of being distinguished from the other piece of information associated with the attribute that is not the common attribute.

9. The non-transitory computer-readable recording medium according to claim 8, wherein the other piece of information is the information associated with the attribute information registered related to the insurance salesperson.

10. The non-transitory computer-readable recording medium according to claim 1, the process further comprising selecting, from among the pieces of the attribute information related to the customer, in accordance with reaction information indicating a level of a reaction related to the first customer information registered by being associated with the attribute information, attribute information in which the degree of common with respect to the attribute information registered related to the insurance salesperson is evaluated.

11. A schedule management method for managing a schedule of making a phone call to a customer or visiting to the customer for an insurance salesperson, the schedule management method comprising:
storing contents information including an article of a newspaper, customer information, a schedule of the insurance salesperson and a task related to a contact in a storage unit;
specifying, by a processor, when a task related to the contact with respect to a first customer is included in a schedule of the insurance salesperson stored in a storage unit, a common attribute in accordance with an evaluation result related to the degree of common between attribute information registered related to the insurance salesperson and attribute information registered related to the first customer;

retrieving a content in which many search keys are included in the item of the specified common attribute and the evaluation is high from the storage unit; and controlling, by the processor to display the retrieved content being associated with the task for providing an appropriate conversation topic to the customer.

12. A schedule management device that manages a schedule of making a phone call to a customer or visiting to the customer for an insurance salesperson, the schedule management device comprising:

a processor that executes a process, the process including:

storing contents information including an article of a newspaper, customer information, a schedule of the insurance salesperson and a task related to a contact in a storage unit;

specifying, when a task related to the contact with respect to a first customer is included in a schedule of the insurance salesperson stored in a storage unit, a common attribute in accordance with an evaluation result related to the degree of common between attribute information registered related to the insurance salesperson and attribute information registered related to the first customer;

retrieving a content in which many search keys are included in the item of the specified common attribute and the evaluation is high from the storage unit; and controlling to display the retrieved content being associated with the task for providing an appropriate conversation topic to the customer.

* * * * *